United States Patent
Nakayama

(10) Patent No.: US 8,502,913 B2
(45) Date of Patent: Aug. 6, 2013

(54) VIDEO PROCESSING APPARATUS AND VIDEO PROCESSING METHOD

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 12/969,746

(22) Filed: Dec. 16, 2010

(65) Prior Publication Data

US 2011/0157425 A1 Jun. 30, 2011

(30) Foreign Application Priority Data

Dec. 25, 2009 (JP) ................................ 2009-296389

(51) Int. Cl.
*H04N 5/238* (2006.01)

(52) U.S. Cl.
USPC ............................ 348/364; 348/365; 348/234

(58) Field of Classification Search
USPC .............. 348/222.1, 234, 235, 345, 349, 362, 348/364, 229.1
See application file for complete search history.

(56) References Cited

U.S. PATENT DOCUMENTS

| | | | | |
|---|---|---|---|---|
| 2007/0052821 A1* | 3/2007 | Fukui | ........................... | 348/234 |
| 2009/0073287 A1* | 3/2009 | Shimizu | ....................... | 348/234 |
| 2012/0314095 A1* | 12/2012 | Fukui | ....................... | 348/220.1 |

FOREIGN PATENT DOCUMENTS

| | | |
|---|---|---|
| JP | 03-263870 | 11/1991 |
| JP | 05-103256 | 4/1993 |

* cited by examiner

*Primary Examiner* — Tuan Ho

(74) *Attorney, Agent, or Firm* — Cowan, Liebowitz & Latman, P.C.

(57) ABSTRACT

An imaging apparatus includes a histogram shape determination unit that acquires a histogram of luminance values from video captured by an image capturing unit and determines whether or not the captured video is a night scene from the shape of the histogram. The imaging apparatus also includes a point light source determination unit that acquires the maximum value of contrast for each horizontal line in the video as a line evaluation value and determines whether the captured video is a night scene based on whether or not the line evaluation value has a characteristic of an object as a point light source. If the histogram shape determination unit and the point light source determination unit determine that the captured video is a night scene, the imaging apparatus determines that the scene captured by the image capturing unit is a night scene.

15 Claims, 8 Drawing Sheets

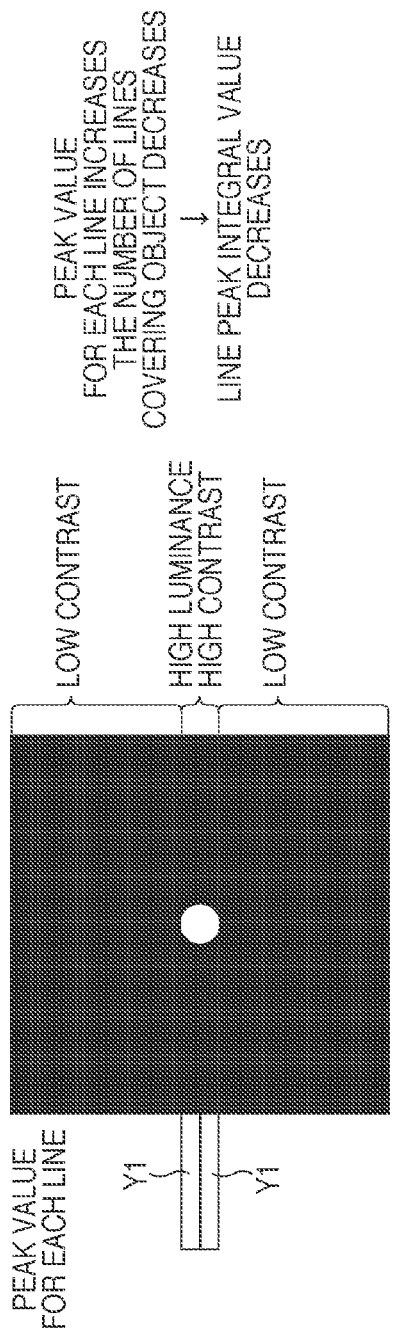
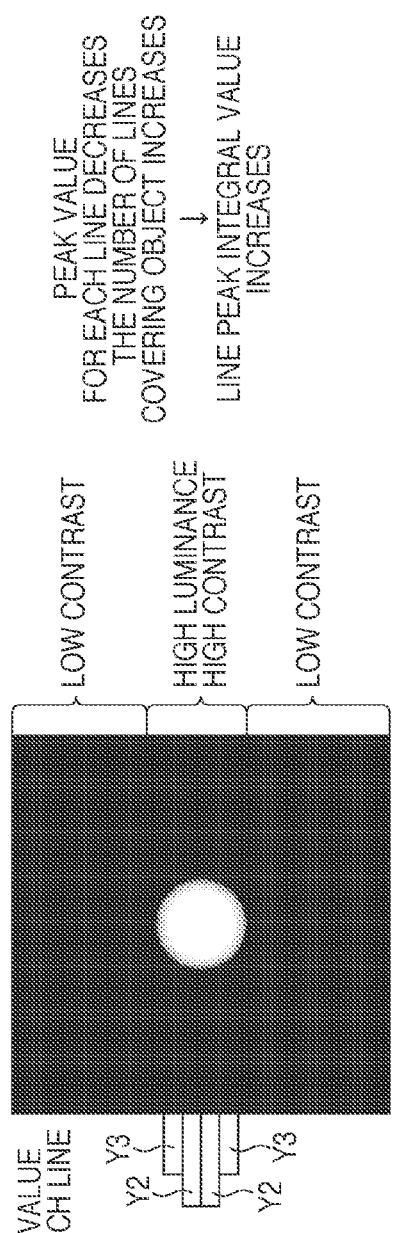

VIDEO PROCESSING APPARATUS AND VIDEO PROCESSING METHOD

BACKGROUND OF THE INVENTION

1. Field of the Invention

The present invention relates to a video processing apparatus and a video processing method, and more particularly to a method for detecting a shot scene based on imaging signals of an imaging apparatus and performing signal processing.

2. Description of the Related Art

An imaging apparatus such as an electronic camera is provided with an automatic exposure control unit for automatically setting the exposure to an optimal value. However, at times such as when shooting a night scene, an appropriate photometric value cannot be obtained because of a large difference in luminance between an object and the background, so that an appropriate exposure cannot be set. Shooting a night scene with an inappropriate exposure setting may cause washed-out colors of neon lamps of the object, resulting in an unnatural image. To solve this inconvenience, detecting a histogram of luminance levels to determine a scene as a night scene from the shape of the histogram has been proposed (see Japanese Patent Application No. 03-263870, hereinafter referred to as a document 1).

With reference to FIG. 2, the night scene determination method according to the proposal in the document 1 will be described below. FIG. 2 is a diagram for describing a histogram for a night scene. In the proposed night scene determination method, a scene is determined as a night scene if the histogram has a distribution mainly consisting of extremely high luminance levels and extremely low luminance levels, like a solid-line histogram shown in FIG. 2. For more accurate night scene determination, control is also performed to determine a scene as a night scene only when the gain is very high or when aperture encoder information indicates a position near the maximum aperture. Once the scene is determined as a night scene, the exposure is controlled to lower the aperture. This allows obtaining an optimal shot image without washed-out colors.

However, the above proposed method has the following inconveniences. For example, a histogram in shooting a backlit scene is also likely to have a distribution mainly consisting of extremely high luminance levels and extremely low luminance levels. A histogram for a high-contrast object can also have a similar distribution. In contrast, a histogram distribution for a somewhat too bright or dark night scene may not fall within expected threshold level ranges. In these cases, the accuracy of night scene determination in the proposed night scene determination method based on the histogram shape of luminance levels is reduced. Consequently, a scene other than a night scene may be erroneously determined as a night scene, or an actual night scene may not be able to be detected as a night scene.

SUMMARY OF THE INVENTION

The present invention has been made in view of the above inconveniences. According to an embodiment of the present invention, there are provided a video processing apparatus and a video processing method that enable more accurate night scene determination.

According to one aspect of the present invention, there is provided a video processing apparatus comprising: a first acquisition unit that acquires a histogram of luminance values from luminance signals of video captured by an image capturing unit; a first determination unit that determines whether or not the video is a night scene video based on a shape of the histogram acquired by the first acquisition unit; a second acquisition unit that acquires an evaluation value of contrast based on high-frequency components of the luminance signals of the video; a second determination unit that determines whether or not the video includes an object as a point light source based on the evaluation value acquired by the second acquisition unit; and a night scene determination unit that determines that the scene captured by the image capturing unit is a night scene if the first determination unit determines that the video is a night scene video and if the second determination unit determines that the video includes an object as a point light source.

According to another aspect of the present invention, there is provided a video processing apparatus comprising: a first acquisition unit that acquires a histogram of luminance values from video captured by an image capturing unit; a first determination unit that determines whether or not the video is a night scene video based on a shape of the histogram acquired by the first acquisition unit; a second acquisition unit that acquires the number of pixels with a luminance value larger than a predetermined luminance value within a partial area defined in the video; a second determination unit that determines whether or not a ratio of the number of pixels acquired by the second acquisition unit to the total number of pixels in the video is higher than a predetermined value; and a night scene determination unit that determines that the scene captured by the image capturing unit is a night scene if the first determination unit determines that the video is a night scene video and if the second determination unit determines that the ratio is higher than the predetermined value.

Further features of the present invention will become apparent from the following description of exemplary embodiments with reference to the attached drawings.

BRIEF DESCRIPTION OF THE DRAWINGS

FIGS. 4A and 4B are diagrams for describing an AF evaluation value for a point light source;

DESCRIPTION OF THE EMBODIMENTS

First Embodiment

Figure 1:
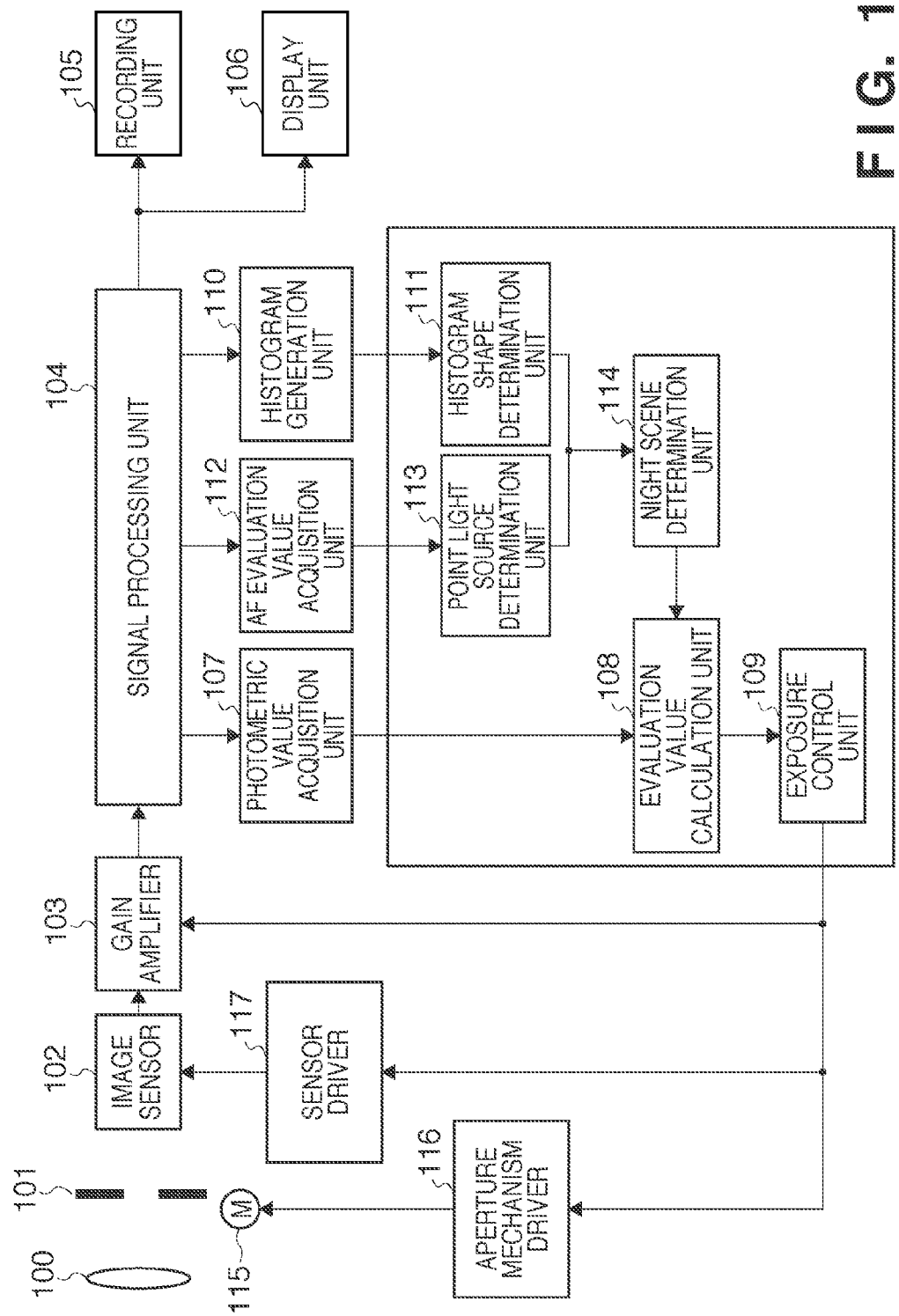
FIG. 1 is a block diagram of a video camera in a first embodiment.

FIG. 1 is a block diagram of an imaging system in a video camera according to a first embodiment. In FIG. 1, light entering through a lens 100 is adjusted to appropriate exposure by an optical aperture 101 that adjusts the amount of exposure, and subjected to photoelectric conversion by an image sensor 102. The image sensor 102 includes an image pickup device such as a CCD or CMOS device. Video signals resulting from the photoelectric conversion by the image sensor 102 are converted into signals of appropriate levels by a gain amplifier 103 that changes the gain, and then input into a signal processing unit 104. The signal processing unit 104 performs processing for luminance signals and color signals of the input signals, such as gamma processing, edge enhancement processing, noise reduction processing, white balance processing, color balance processing, and encoding processing conformable to various recording formats. The video signals resulting from the signal processing by the signal processing unit 104 are recorded as a moving image by a recording unit 105. The video signals are also input to and displayed on a display unit 106 in order to allow the image being shot to be monitored in real time. The display unit 106 also displays the status of the imaging apparatus and various user-set statuses as OSD display superimposed on the video being shot.

Now, components related to exposure control in the imaging apparatus will be described. In the exposure control in the embodiment, optimal video signal levels are maintained by evaluating the exposure based on luminance levels of shot video and performing feedback control for the amount of incident light, the accumulation time, and the amplifier gain of the imaging signals. A photometric value acquisition unit 107 acquires exposure information based on luminance signals being subjected to signal processing from the signal processing unit 104. More specifically, the photometric value acquisition unit 107 acquires, as a photometric value, a luminance level signal integrated for each area from video signals being subjected to signal processing.

An evaluation value calculation unit 108 calculates an evaluation value for the exposure control based on the photometric values acquired by the photometric value acquisition unit 107. Various evaluation methods may be employed for the video signal-based exposure evaluation, including, for example, center-weighted averaging metering that weights a center portion in an imaging area, peak metering that uses only bright areas among a plurality of areas, and averaging metering that meters light based on an overall average. Generally, these evaluation methods are used as appropriate by switching among calculation methods depending on a shooting mode and the like. The evaluation value calculation unit 108 further calculates a target level for the exposure control performed in an exposure control unit 109. The target level may vary with conditions of the object or the photometric method and is set as a level to which the evaluation value should reach. For example, the evaluation value calculation unit 108 indicates to the exposure control unit 109 a direction to increase the amount of exposure if the evaluation value is lower than the target level, or conversely a direction to reduce the amount of exposure if the evaluation value is higher than the target level.

The exposure control unit 109 determines exposure control parameters, such as the aperture value, shutter speed (charge accumulation time), and amplifier gain, with respect to the exposure control direction instructed by the evaluation value calculation unit 108. The exposure control is generally performed in a programmed AE scheme in which the control is performed according to a predetermined combination of control parameters depending on the brightness of the object. However, varying combinations of parameters may be used depending on conditions of the object or the photometric method. Among the exposure control parameters determined by the exposure control unit 109, the aperture value is used for controlling an aperture mechanism driver 116, the charge accumulation time is used for controlling a sensor driver 117, and the amplifier gain is used for controlling the gain amplifier 103.

An actuator 115 mechanically operates the optical aperture 101 to change the aperture value. The actuator 115 is driven by the aperture mechanism driver 116 and includes a galvanometer and a stepping motor. The aperture mechanism driver 116 is a driver adapted to the configuration of the actuator 115 and drives the actuator 115 through current control, pulse control, or the like under instructions from the exposure control unit 109. The sensor driver 117, which controls the accumulation time of the image sensor 102, provides timings such as charge accumulation timings and charge reading timings.

Figure 8:
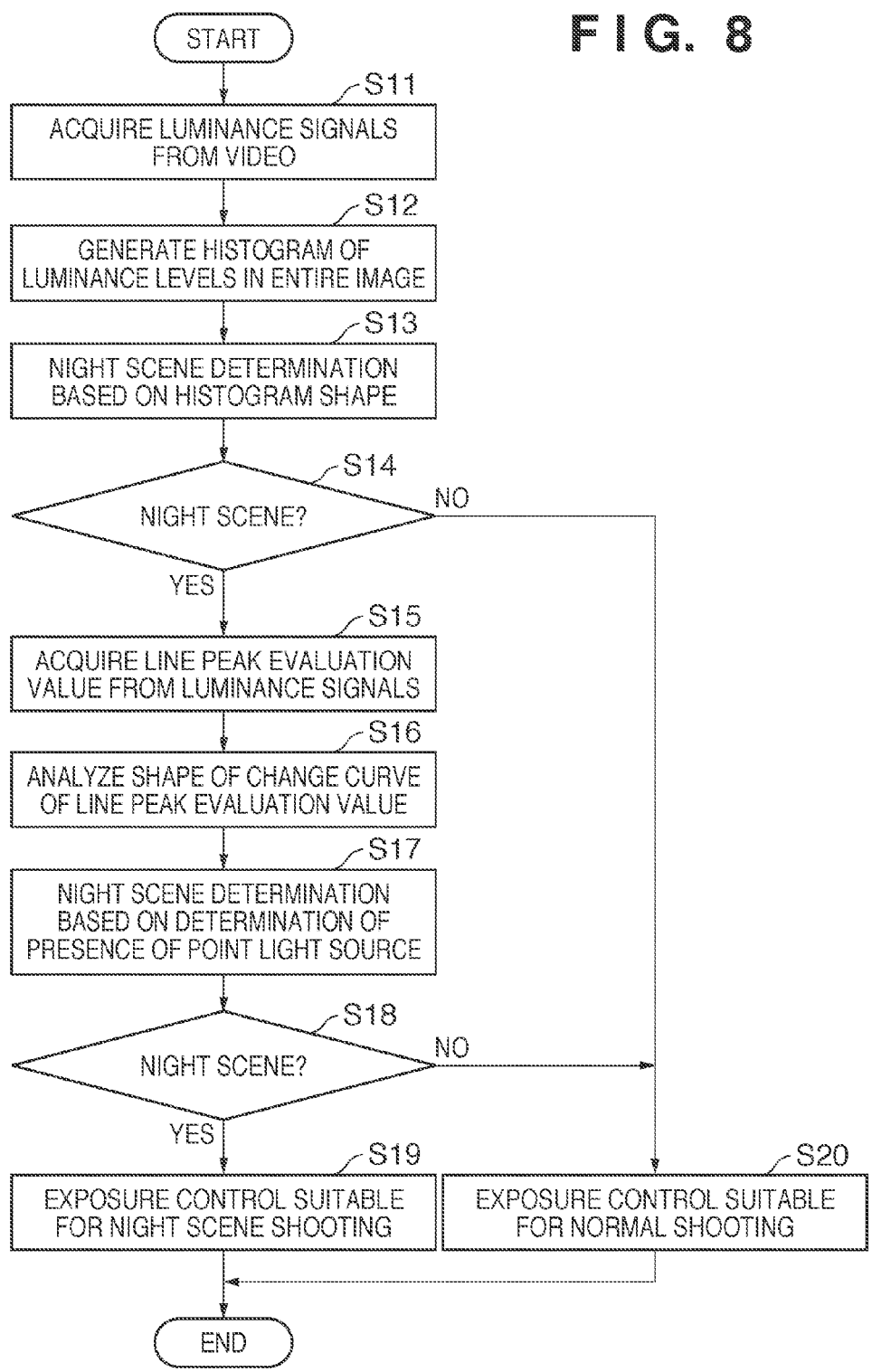
FIG. 8 is a flowchart of a night scene determination process according to the embodiments.

A histogram generation unit 110, a histogram shape determination unit 111, an AF evaluation value acquisition unit 112, a point light source determination unit 113, and a night scene determination unit 114 are components related to determination whether or not a scene is a night scene (hereinafter referred to as night scene determination) according to the embodiment. Processes in these components will be described below. FIG. 8 is a flowchart showing a night scene determination process according to the embodiment. The night scene determination in the embodiment uses two types of information: "the histogram shape of luminance signals" and "point light source determination." First, the night scene determination based on the histogram shape of luminance signals (S11 to S14) will be described. This night scene determination is performed through a first acquisition process of acquiring a histogram of luminance values from video captured by an image capturing unit including the image sensor 102, and a first determination process of determining whether or not the video is a night scene from the shape of the histogram acquired in the first acquisition process. The histogram generation unit 110, which performs the first acquisition process, acquires luminance signals of video being processed from the signal processing unit 104 (S11). The histogram generation unit 110 then generates a histogram distribution of luminance levels from the acquired luminance signals of pixels in all or almost all the area of the video (S12). The histogram information generated by the histogram generation unit 110 is input to the histogram shape determination unit 111. The histogram shape determination unit 111 determines whether or not a night scene is being shot based on the pattern of the luminance level distribution from the histogram information. In the embodiment, an object having a histogram shape with two crests in a low-luminance portion and a high-luminance portion, respectively, is determined as a night scene (S13, S14). Details of the histogram shape will be described later. The result of the determination by the histogram shape determination unit 111 is used for the final night scene determination by the night scene determination unit 114.

Next, a flow of the second night scene determination in the embodiment, namely, the night scene determination based on the point light source determination (S15 to S18) will be described. The night scene determination based on the point light source determination includes a second acquisition process of acquiring an evaluation value of contrast based on high-frequency components of the luminance signals of the video, and a second determination process of determining whether the video is a night scene by determining whether or not the video includes a point light source object based on the evaluation value. An auto-focus (AF) unit (not shown in FIG. 1) employed in a video apparatus such as a video camera generally uses what is called a TV-AF scheme. In this scheme, the focus is adjusted by extracting high frequency components in video signals obtained from the image sensor and driving a focus lens in the optical-axis direction so that the high frequency components are increased. One evaluation value for the TV-AF scheme is a line peak integral evaluation value obtained by vertically integrating a peak value of evaluation values for each horizontal line. The line peak integral evaluation value is a stable evaluation value with few noises by virtue of integral effect, so that it is insusceptible to momentary noises. Also, the line peak integral evaluation value involves signal changes sensitive to a small focus movement. As such, the line peak integral evaluation value is optimal for determining the direction in an auto-focus process (determining the lens moving direction). Although the auto-focus unit uses the line peak integral evaluation value within an AF frame, the night scene determination described below uses the line peak integral evaluation value for the entire area of the video. In cases such as where partial areas requiring no point light source determination are known in advance, the line peak integral evaluation value only in the remaining relevant partial areas rather than the entire area may be used. Alternatively, the line peak integral evaluation value only within a predetermined partial area rather than the entire video area may be used.

The AF evaluation value acquisition unit 112 acquires luminance signals from the signal processing unit 104, extracts high frequency components from the luminance signals, and acquires the line peak integral evaluation value resulting from vertically integrating a peak value of evaluation values for each horizontal line (the sum of peak values for all the horizontal lines) (S15). As will be described in detail later, normally, the maximum point of the line peak integral evaluation value corresponds to the in-focus position. However, shooting a point light source object is characterized by the fact that the maximum point of the line peak integral evaluation value does not correspond to the in-focus position. The point light source determination unit 113 acquires the line peak integral evaluation value from the AF evaluation value acquisition unit 112 while the auto-focus unit drives the focus lens in the optical-axis direction. The point light source determination unit 113 thereby acquires and analyzes a change curve of the evaluation value (S16). Based on the change curve of the evaluation value, the point light source determination unit 113 determines whether the point light source is included in an object being shot. If so, the point light source determination unit 113 determines that the scene is a night scene (S17). In this determination, the above-described characteristic that "for a point light source, the maximum point of the line peak integral evaluation value does not correspond to the focus position" is utilized. The result of the determination by the point light source determination unit 113 is used for the final night scene determination by the night scene determination unit 114 together with the result of the determination by the histogram shape determination unit 111.

The night scene determination unit 114 determines whether the shot scene is a night scene from the histogram shape-based determination and the point light source determination described above. More specifically, if both of the determination results of the determinations by the histogram shape determination unit 111 and the point light source determination unit 113 described above indicate a night scene, the night scene determination unit 114 finally determines the scene as a night scene (S14, S18). If the night scene determination unit 114 determines the scene as a night scene, the evaluation value calculation unit 108 calculates an evaluation value and sets a target value as appropriate for shooting a night scene (S19). On the other hand, if it is determined that the scene is not a night scene in at least one of the night scene determination based on the histogram shape and the night scene determination based on the point light source determination, the evaluation value calculation unit 108 calculates an evaluation value and sets a target value as appropriate for shooting a scene other than a night scene (S20). Thus, the configuration of the video processing apparatus in the embodiment has been described. It is to be noted that the order of processes of the night scene determination based on the histogram shape (steps S11 to S14) and the night scene determination based on the point light source determination (steps S15 to S18) is not limited to the above description. For example, the night scene determination based on the point light source determination may be performed first, or the both processes may be performed in parallel.

<Determination Based on Histogram Shape>

Figure 2:
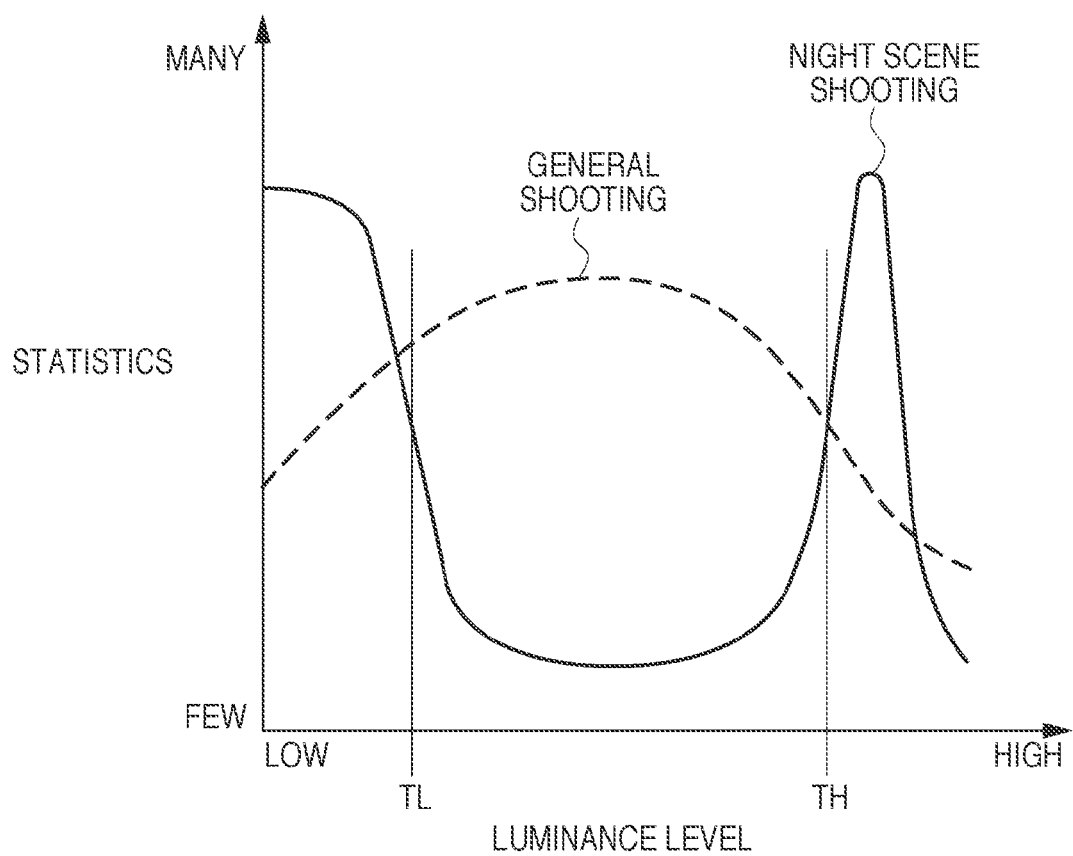
FIG. 2 is a diagram showing an exemplary histogram for detecting a night scene with an imaging apparatus.

Now, the way of determining a scene as a night scene from the histogram shape of luminance signals will be described. As described with reference to FIG. 2, a typical luminance histogram for a night scene often has values distributed at extremely high luminance levels and extremely low luminance levels. The extremely high luminance levels correspond to illumination portions in the night scene object, whereas the extremely low luminance levels correspond to non-illumination portions in the night scene object.

Figure 5A:
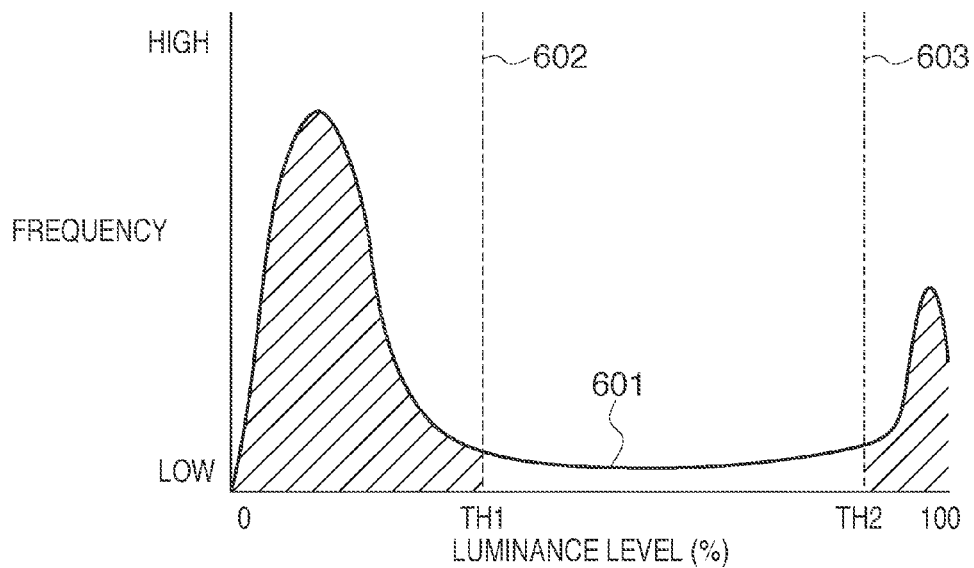
FIGS. 5A and 5B are diagrams of histograms in night scene shooting.

FIG. 5A is a graph showing an exemplary luminance histogram for a night scene. A solid-line curve represents a luminance histogram curve 601 for the night scene. A dotted line 602 represents a low-luminance threshold TH1 for detecting a frequency distribution in a low-luminance portion, and a dotted line 603 represents a high-luminance threshold TH2 for detecting a frequency distribution in a high-luminance portion. Thus, the histogram is divided into three portions by the low-luminance threshold TH1 and the high-luminance threshold TH2. One method of detecting the frequency of extremely high luminance levels and the frequency of extremely low luminance levels is to count the number of pixels within each luminance range defined by the low-luminance threshold TH1 and the high-luminance threshold TH2 as a frequency, which can then be compared with each other. First, for detecting the frequency of extremely low luminance levels, the number of pixels at luminance levels not higher than the low-luminance threshold TH1 is counted. Specifically, the sum of the number of pixels in a shaded portion not higher than the low-luminance threshold TH1 in the histogram curve 601 is considered as the area of non-illumination portions. Normalizing (averaging) this number for the luminance level range (TH1 to 0) yields an average frequency in the low-luminance range, which serves as an evaluation value for the low luminance levels.

Similarly, for detecting the frequency of middle luminance levels, the number of pixels at luminance levels higher than the low-luminance threshold TH1 and lower than the high-luminance threshold TH2 is counted. Normalizing (averaging) this number for the luminance level range (TH2 to TH1) yields an evaluation value for the middle luminance levels. Also, for detecting the frequency of high luminance levels, the number of pixels at luminance levels not lower than the high-luminance threshold TH2 is counted. Normalizing (averaging) this number for the luminance level range (TH2 to 100) yields an evaluation value for the high luminance levels. In order for an object with a histogram shape as in FIG. 5A to be determined as having a distribution mainly consisting of extremely high luminance levels and extremely low luminance levels, the following conditions 1 and 2 need to be met.

(evaluation value for low luminance levels>evaluation value for middle luminance levels)    condition 1

(evaluation value for high luminance levels>evaluation value for middle luminance levels)    condition 2

That is, the image is determined as a night scene if both of the conditions 1 and 2 are met.

Figure 5B:
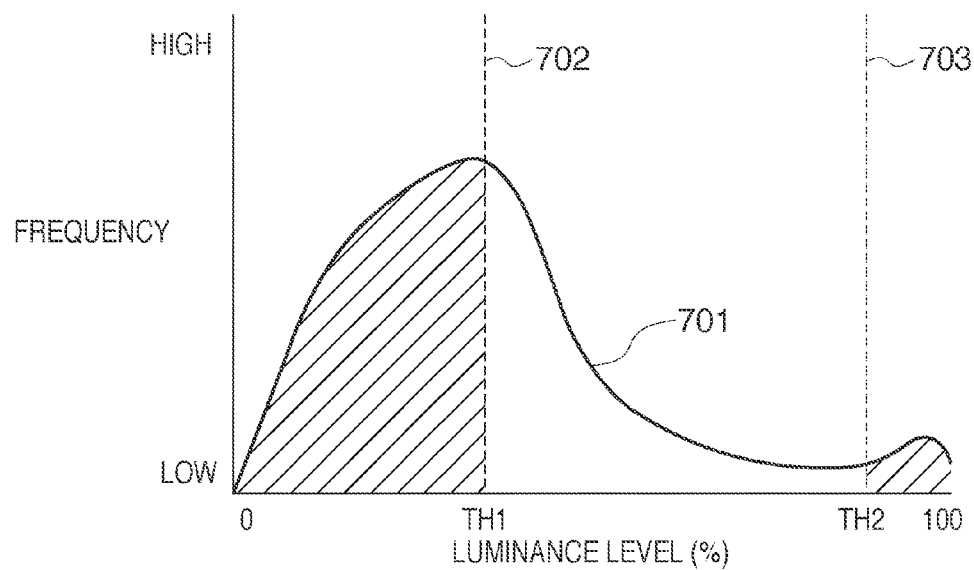

The above is similar to the method proposed in the patent document 1, and it is possible to perform the night scene determination according to the above conditions. However, actual night scenes vary. For example, for a night scene close to a twilight scene, the frequency of middle luminance levels may be high because of the still incomplete darkness. Also, few illuminations may cause a low frequency of high luminance levels, resulting in the evaluation value for high luminance levels smaller than the evaluation value for middle luminance levels. FIG. 5B is a graph showing an exemplary histogram for a night scene that includes fewer illuminations than the night scene illustrated in FIG. 5A and that is generally brighter, thereby exhibiting a high frequency of middle luminance levels.

To improve the accuracy of the night scene detection, it is necessary to be able to detect even a night scene that takes on the histogram shown in FIG. 5B. In FIG. 5B, a solid-line curve represents a luminance histogram curve 701 for the night scene. A dotted line 702 represents a low-luminance threshold TH1 for detecting a frequency distribution in a low-luminance portion, and a dotted line 703 represents a high-luminance threshold TH2 for detecting a frequency distribution in a high-luminance portion. While the histogram curve 701 in FIG. 5B is different from the histogram curve 601 in FIG. 5A, the low-luminance threshold TH1 and the high-luminance threshold TH2 in FIG. 5B are set at the same luminance levels as in FIG. 5A.

The method described above with reference to FIG. 5A can be used for the histogram shown in FIG. 5B to count the number of pixels in each portion defined by the low-luminance threshold TH1 and the high-luminance threshold TH2. Then, an evaluation value for low luminance level, an evaluation value for middle luminance levels, and an evaluation value for high luminance levels can be obtained. In order for an object with a histogram shape as in FIG. 5B to be determined as a night scene, firstly the above "condition 1" should be met. The "condition 2" does not need to be met because this night scene has a high distribution at middle luminance levels, and has a low distribution at high luminance levels due to the fewer illuminations. However, if the evaluation value for high luminance levels is larger than the evaluation value for low luminance levels, the scene cannot be considered as a night scene. Therefore, the following condition 3 should be met.

(evaluation value for low luminance levels>evaluation value for high luminance levels)     condition 3

This also applies to the case of a distribution mainly consisting of extremely high luminance levels and extremely low luminance levels. Summarizing the above, it can be seen that the detection of the night scene objects represented by the histograms in FIGS. 5A and 5B requires common conditions: the condition 1 and the condition 3 should be met.

(evaluation value for low luminance levels>evaluation value for middle luminance levels)     condition 1

(evaluation value for low luminance levels>evaluation value for high luminance levels)     condition 3

Therefore, the embodiment determines whether or not a scene is a night scene according to these conditions.

In this manner, a scene can be determined as a night scene by evaluating the histogram shape of luminance signals. Therefore, the embodiment performs the night scene determination according to whether "the condition 1 and the condition 3 are met" as described above. Alternatively, an object can be determined as a night scene if "the condition 1 and the condition 3 are met" or "the condition 1 and the condition 2 are met." However, as mentioned above, a scene such as a backlit scene takes on a histogram shape similar to a histogram shape of a night scene. Therefore, highly accurate night scene detection is not possible only with the described configuration. In the embodiment, the histogram shape of luminance signals is utilized as one of conditions for the night scene detection, and conditions such as the point light source detection to be described below are further added to realize highly accurate night scene detection.

<Determination Based on Point Light Source Detection>

Now, the way of determining a point light source from an AF evaluation value will be described. As described above, in a TV-AF system using a line peak integral evaluation value obtained by vertically integrating a peak value of evaluation values for each horizontal line, a point light source can be detected. The line peak integral evaluation value is a stable evaluation value with few noises by virtue of integral effect, so that it is insusceptible to momentary noises. Also, the line peak integral evaluation value involves signal changes sensitive to a small focus movement. As such, the line peak integral evaluation value is optimal for determining the driving direction of the focus lens.

Figure 3A:
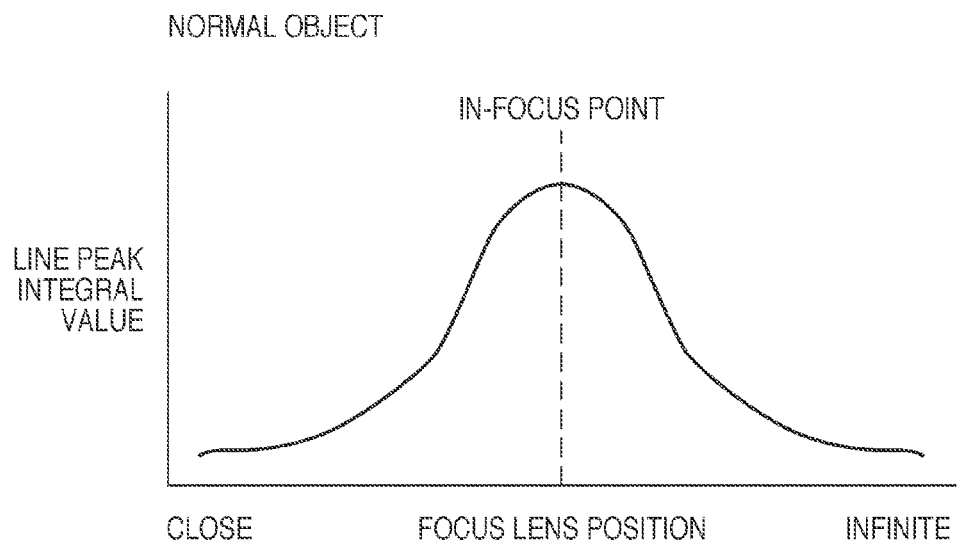
FIGS. 3A and 3B are diagrams showing exemplary graphs of a line peak integral evaluation value.

FIG. 3A is a graph showing the relationship between the line peak integral evaluation value and the focus lens position (a change curve of the line peak integral evaluation value) in shooting a normal object. As shown in FIG. 3A, for a normal object, the contrast of the image is improved as the in-focus position is approached, so that the line peak integral evaluation value increases. Therefore, the AF control is performed to find a point where the line peak integral evaluation value is maximized while moving the focus lens position, and to set the point as the in-focus position.

However, a lens position corresponding to a large line peak integral evaluation value may not be the in-focus position in certain cases. FIGS. 4A and 4B are diagrams of an object like a point light source shot at an in-focus focus lens position and at an out-of-focus focus lens position, respectively, where the line peak integral evaluation value is shown to the left of the images. When an object like a point light source with its length varying with focus adjustment is shot, the following is observed. For the point light source in an in-focus state as in FIG. 4A, a peak value (Y1) in each line is large, but the number of lines that cover the object image is small. Therefore, the line peak integral evaluation value decreases. On the other hand, for the point light source in an out-of-focus state as in FIG. 4B, a peak value (Y2, Y3) in each line is small (Y1>Y2>Y3), but the number of lines that cover the object image is large. Therefore, the line peak integral evaluation value increases. That is, a phenomenon occurs that the line peak integral evaluation value is maximized (Y2×2+Y3×2) around the in-focus position and reduced (Y1×2<Y2×2+Y3×2) at the in-focus position.

Figure 3B:
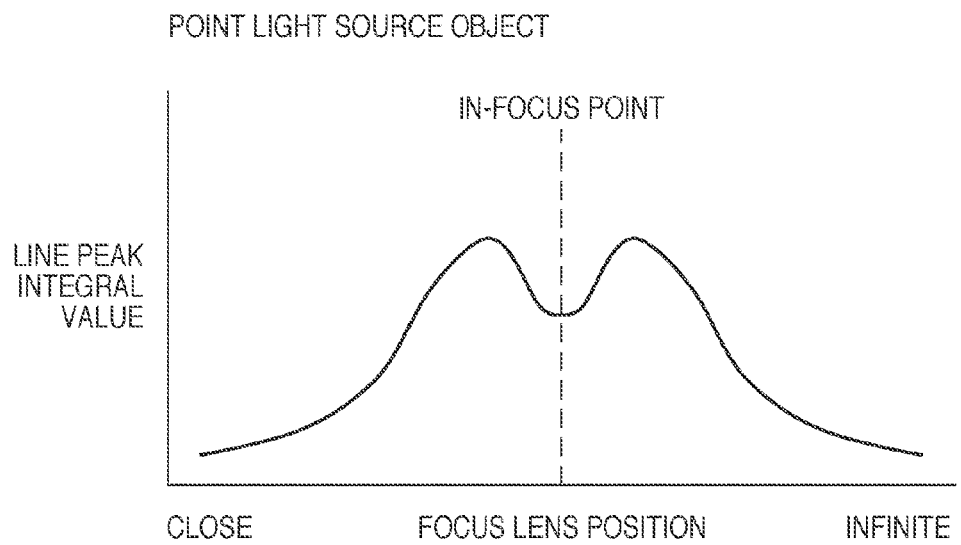

FIG. 3B is a graph showing the relationship between the line peak integral evaluation value and the focus lens position in shooting an object like a point light source. As in FIG. 3B, for an object like a point light source, the maximum point of the line peak integral evaluation value does not correspond to the in-focus position. Therefore, the AF control is performed to identify an object like a point light source for which the line peak integral evaluation value decreases at the in-focus position and to switch the auto-focus control. This allows reliable focusing.

The point light source determination unit 113 in the embodiment utilizes the above-described characteristic that "for a point light source, the maximum point of the line peak integral evaluation value does not correspond to the in-focus position." Based on the line peak integral evaluation value, it is determined whether a point light source is included in an object being shot.

The line peak integral evaluation value is used as the AF evaluation value. On the other hand, a point light source object as shown in FIGS. 4A and 4B takes on a characteristic distribution of the line peak integral evaluation value as shown in FIG. 3B. This can be utilized to perform the point light source determination even from the relationship between high-luminance lines and low-contrast lines. That is, a night scene is characterized in that high-luminance and high-contrast lines that include point light sources exist among many other low-luminance and low-contrast lines. Therefore, the point light source determination can also be performed based the ratio between high-luminance lines and low-contrast lines. Specifically, if the ratio of the number of horizontal lines with the above-described evaluation value larger than a second threshold larger than a first threshold to the number of horizontal lines with the above-described evaluation value smaller than the first threshold is not higher than a predetermined value, it is determined that the video includes a point light source.

It is further possible to use both of the point light source determination based on the ratio between high-contrast lines and low-contrast lines and the determination utilizing the fact that the line peak integral evaluation value is maximized around the in-focus position and reduced at the in-focus position described above. In this manner, the accuracy of the point light source determination can be further improved.

The above-described point light source determination using the line peak integral evaluation value is utilized as one of conditions for the night scene detection, and can realize highly accurate night scene determination when used together with the above-described night scene detection conditions based on the histogram shape of luminance signals. Although the line peak integral evaluation value for the entire video area is used in the above description, the line peak integral evaluation value for video only within the AF frame used by the auto-focus unit may be used. In this case, the line peak integral evaluation value obtained by the auto-focus unit for detecting the focus position can be directly used. Further, when several AF frames exist, a scene may be determined as a night scene if the above-described characteristic indicating a point light source is detected in at least one of the AF frames.

Now, exposure control upon determination as a night scene will be described. Generally, when a night scene is shot with normal exposure control unconscious of a night scene, control is performed for lightening the object more than how the object actually looks, because of many dark portions in the scene. This causes the necessity of providing high gain and therefore increases shot noises, and the dark portions are lightened to present faded video. Further, illumination portions saturate in the image sensor or in the signal processing and exhibit a washed-out state (whiteout condition).

While various exposure controls suitable for night scenes are possible, an exemplary exposure control is to employ a photometric method suitable for night scenes. To prevent illumination portions from being washed out, photometry involving generating a photometric evaluation value from a peak level of luminance in the video (peak metering) is effective. Controlling the peak level of luminance to a level free from washed-out colors allows not only colors and tones of the illuminations to be represented, but also the dark portions to be shot as dark. However, applying peak metering to a normal object would result in video darker than a proper level. Therefore, peak metering can be performed if a scene is determined as a night scene in the described manner. With this configuration, an optimal exposure can be automatically obtained for scenes ranging from normal scenes to night scenes without any special switching.

Another exemplary exposure control suitable for night scenes is to lower the target level of exposure. As described above, when a night scene is shot with normal exposure control unconscious of a night scene, control is performed for lightening the object more than how the object actually looks, because of many dark portions in the scene. To avoid this, the target level of exposure may be lowered, so that unnecessarily lightening the dark portions in the object can be prevented. The same effect can also be achieved by restraining the amount of exposure control to avoid an increase of the gain, and these approaches can be combined with the above-described peak metering to further increase the effect. However, applying these approaches to a normal object other than a night scene would result in video darker than a proper level. Therefore, the exposure control can be automatically switched if a scene is determined as a night scene in the described manner. With this configuration, an optimal exposure can be automatically obtained for scenes ranging from normal scenes to night scenes without any special switching.

Thus, the night scene determination according to the first embodiment has been described. According to the embodiment, a scene is determined as a night scene if the histogram shape has two crests at the low-luminance portion and the high-luminance portion respectively, and if the object includes a point light source. In this manner, the night scene determination can be properly performed even for an image that would be erroneously determined as a night scene by imaging control based on general night scene determination (for example, a shot image of a backlit scene). Therefore, switching to the exposure control targeted to night scenes can be appropriately performed to obtain an optimal image. Further, a night scene can be detected even if the histogram shape has few night scene characteristics, for example in the case of a somewhat too bright night scene.

Although the embodiment has been described using the line peak integral evaluation value for the AF control, a point light source may be detected only for the night scene detection. A point light source may also be readily detected on a pixel basis rather than a line basis. Also, the embodiment has been described for the configuration in which the exposure control is switched depending on the night scene determination. However, it is to be understood that effects of night scene shooting may also be achieved by modifying the $\gamma$ curve or setup level of luminance or modifying color-signal processing depending on the night scene determination, or by the combination of these modifications.

Second Embodiment

Figure 6:
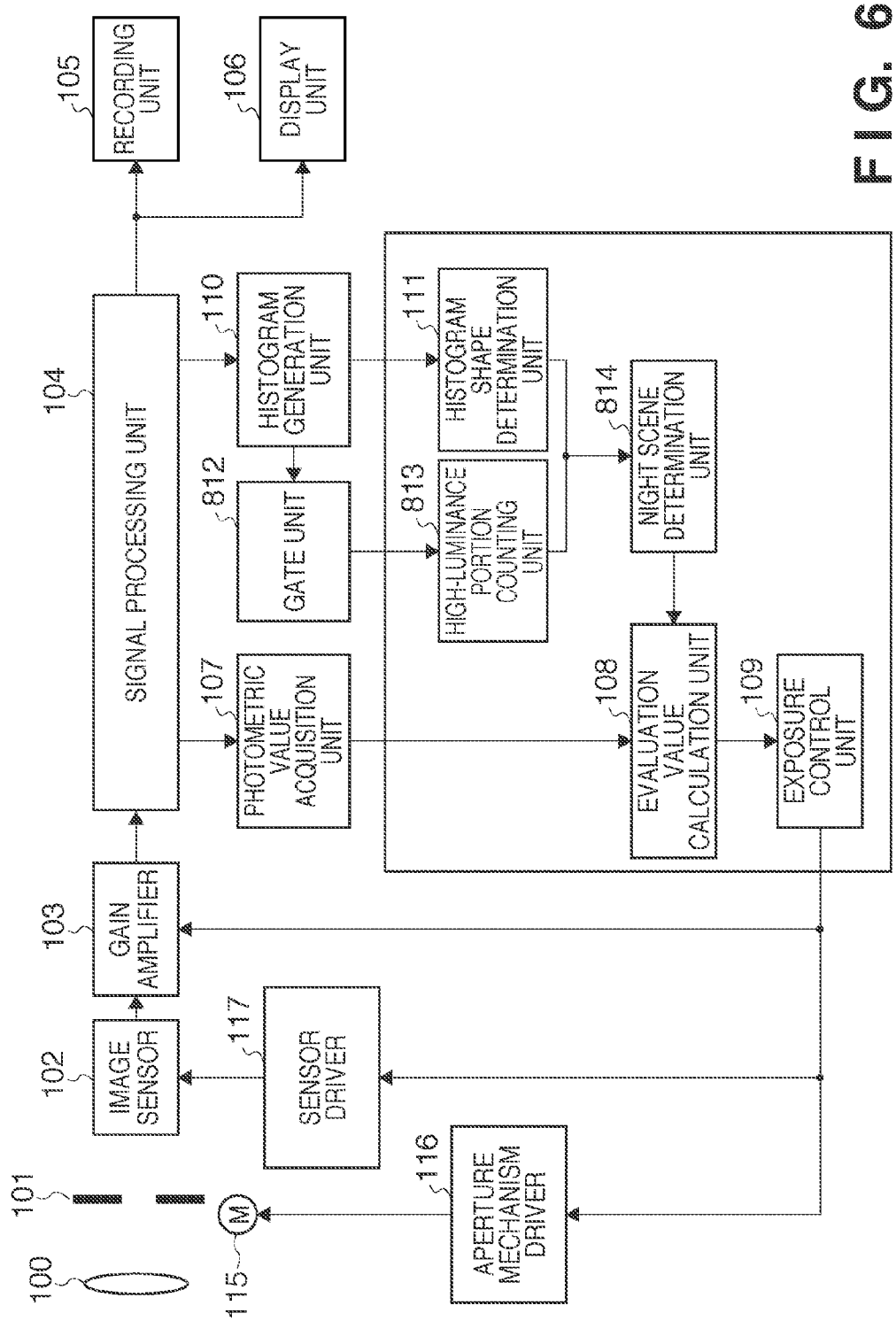
FIG. 6 is a block diagram of a video camera in a second embodiment.

In the first embodiment, the night scene determination is performed by using the two types of information: "the histogram shape of luminance signals" and "the point light source determination." A second embodiment uses "determination based on the ratio of high-luminance pixels in a center portion (to be described below)" instead of "the point light source determination." FIG. 6 is a block diagram of an imaging system in a video camera according to the second embodiment. In FIG. 6, the same components as in the video camera in the first embodiment (FIG. 1) are given like reference numerals. A gate unit 812 extracts frequencies for only the center portion of an image from a histogram generated by the histogram generation unit 110. A high-luminance portion counting unit 813 calculates the ratio of the number of pixels falling within the high-luminance portion in the center portion of the image extracted by the gate unit 812 to the entire image. Based on the night scene determination by the histogram shape determination unit and the night scene determination based on the ratio of high-luminance pixels in the center portion, a night scene determination unit 814 determines whether the shot scene is a night scene. Exposure control is similar to the first embodiment.

A configuration of the night scene determination according to the second embodiment will be described below. The night scene determination according to the second embodiment involves processes based on two types of information, and one of the processes is the determination based on the histogram shape of luminance signals (the first acquisition process and the first determination process) as in the first embodiment. The flow of generating a histogram and performing the night scene determination based on the histogram has been described in the first embodiment (steps S11 to S14) and therefore will not be described here. The result of the determination by the histogram shape determination unit 111 is eventually used for the determination by the night scene determination unit 814.

Now, a flow of the second night scene determination in the second embodiment, namely, the determination based on the ratio of high-luminance pixels in the center portion, will be described. In the second embodiment, the second acquisition process and the second determination process for the night scene determination based on the point light source in the first embodiment are replaced with the determination based on the ratio of high-luminance pixels in the center portion. Specifically, in the second acquisition process, the number of pixels above a predetermined luminance value within a partial area defined at the center of the video is acquired. In the second determination process, it is determined whether or not the video is a night scene based on the ratio of the acquired number of pixels to the total number of pixels in the video. This night scene determination process is performed in steps S15 to S18 in FIG. 8.

While night scenes range over various sorts of video, if no illuminations are present in the center portion of such video, another object is likely to be there. Such an object may not be a night scene but actually a backlit scene, or a cameraperson is likely to be shooting the video by intentionally placing the main object in the center portion. Performing exposure control suitable for night scenes for such an object results in video in which the center portion is blacked out and the main object has no tones. In view of this, a condition for a night scene is added: "the presence of a high-luminance portion above a threshold in the center portion of video." This reduces erroneous detections and improves the detection accuracy.

The gate unit 812 extracts luminance signals only in the center portion of the video (the second acquisition process). In preparation for the above-described detection of the presence or absence of an illumination in the center portion of the video, the gate unit 812 generates a histogram of luminance signal levels only for the center portion. The high-luminance portion counting unit 813 counts the number of pixels in the high-luminance portion in the histogram only for the center portion generated by the gate unit 812. More specifically, the high-luminance portion counting unit 813 counts the number of pixels in the portion above a predetermined luminance level threshold in the histogram and calculates the ratio of the number of high-luminance pixels in the center portion to the number of pixels in the entire video. The high-luminance portion counting unit 813 compares the calculated ratio of the high-luminance pixels with a threshold, and determines the scene as a night scene if the ratio is above the threshold (the second determination process). The result of the determination by the high-luminance portion counting unit 813 is eventually used for determination by the night scene determination unit 814 together with the result of the determination by the histogram shape determination unit 111.

The night scene determination unit 814 finally determines the scene as a night scene if both of the determination results of the histogram shape determination unit 111 and the high-luminance portion counting unit 813 described above indicate a night scene. If the night scene determination unit 814 determines the scene as a night scene, the evaluation value calculation unit 108 calculates an evaluation value and sets a target value as appropriate for shooting a night scene.

Figure 7:
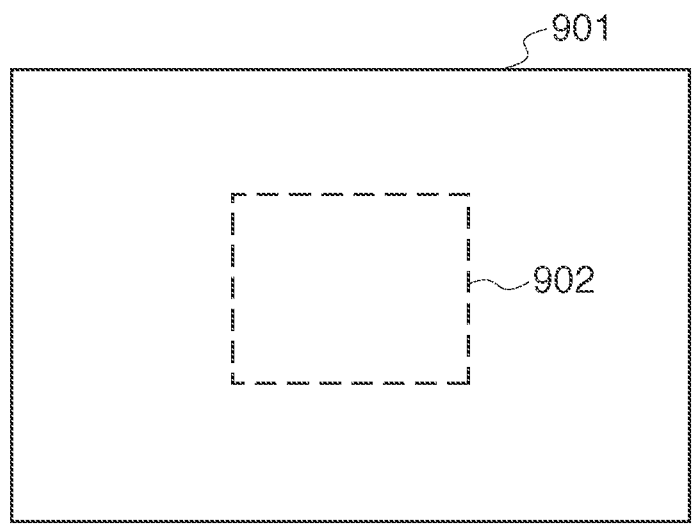
FIG. 7 is a diagram showing a center portion for calculating a histogram in video.

FIG. 7 is a conceptual diagram showing the area of the center portion used by the gate unit 812 with respect to the entire video area. Reference numerals 901 and 902 shown denote the entire video area and the area of the center portion, respectively. An exemplary size and position of the area of the center portion 902 may be such that the width is about one third and located at the center with respect to the width of the entire video area 901, and the height is about one third and located somewhat lower than the center with respect to the height of the area 901. The center portion is located somewhat lower than the center because an object generally tends to be captured somewhat lower than the center of the screen in shooting a night scene. It is to be understood that the setting of the center portion is not limited to the above, and the width may be shifted as well. That is, the area of the center portion does not need to align with the center of the video and may be a partial area with any predetermined size and position, although the following description assumes the above-described partial area as the area of the center portion. The gate unit 812 performs a process of extracting the frequencies of luminance signals only within the area of the center portion 902.

FIG. 5B will be used again to describe the high-luminance levels counted by the high-luminance portion counting unit 813. However, this time, the histogram generated by the gate unit 812 is a histogram for pixels within the area of the center portion 902. The high-luminance portion counting unit 813 counts the number of pixels with a luminance level not lower than a threshold TH2. The threshold TH2 may be or may not be the same as the above-described threshold TH2 used by the histogram shape determination unit 111. If the ratio of the number of pixels with a high luminance level in the center portion to the total number of pixels is higher than a predetermined threshold A, the high-luminance portion counting unit 813 determines the scene as a night scene. Studies on data about various night scenes have found that around 0.7% is appropriate as the threshold A.

The night scene determination using the ratio of the number of high-luminance pixels in the center portion is utilized as one of conditions for the night scene detection, and can realize highly accurate night scene determination when used together with the above-described night scene detection based on the histogram shape of luminance signals.

Exposure control upon determination as a night scene is similar to the exposure control in the first embodiment. For example, peak metering can be performed if a scene is determined as a night scene in the described manner. With this configuration, an optimal exposure can be automatically obtained for scenes ranging from normal scenes to night scenes without any special switching operation. Other examples of the exposure control suitable for night scenes include lowering the target level of exposure, and restraining the amount of exposure control to avoid an increase of the gain, as described in the first embodiment. These approaches can also provide a similar effect, and can be combined with the above-described peak metering to further increase the effect. However, applying these approaches to a normal object other than a night scene would result in video darker than a proper level. Therefore, the exposure control can be automatically switched if a scene is determined as a night scene in the described manner. With this configuration, an optimal exposure can be automatically obtained for scenes ranging from normal scenes to night scenes without any special switching.

Thus, the night scene determination according to the second embodiment has been described. According to the second embodiment, similar effects can be achieved as in the first embodiment.

In the second embodiment, the gate unit 812 extracts the center portion of the video to generate the luminance histogram for the center portion. However, this is not limiting. For example, the gate unit 812 may perform the night scene determination not by extracting only the center portion but by taking a center-weighted average of luminance values. In this case, the center portion is weighted while the surrounding portion is also taken into account, and it is determined whether or not a luminance value obtained as the center-weighted average is higher than a predetermined threshold. Specifically, luminance values of pixels inside a partial area defined at the center of the video may be multiplied by a weighting value larger than a weighting value for pixels outside the partial area to calculate an average of luminance values in the video. If the average luminance value is larger than a predetermined value, the scene may be determined as a night scene. Exemplary weighting values are preferably such that "the weighting value for the center area:the weighting value for the outside of the center area=2:1," although this is not limiting.

As will be described in a third embodiment, the night scene determination based on the point light source detection described in the first embodiment may also be added. Specifically, the acquisition of the line peak integral evaluation value, and the night scene determination by detecting a point light source based on the acquired evaluation value, as described in the first embodiment, may be added as a third acquisition process and a third determination process. If all the first to third determination processes indicate a night scene, the scene may be determined as a night scene. By further adding the point light source determination using the line peak integral evaluation value described in the first embodiment to conditions, the accuracy of the night scene detection can be further improved.

Third Embodiment

According to the above-described first and second embodiments, highly accurate night scene determination can be realized by combinations of the point light source determination using the line peak integral evaluation value, the histogram shape of luminance signals, and even the ratio of the number of high-luminance pixels in the center portion. However, even a night scene detected with high accuracy may be determined as not a night scene due to a slight change in the object if the night scene has been detected with an evaluation value close to the threshold of each condition. Considering the exposure control upon determination as a night scene, frequent changes of detected scenes (switches between a night scene and a non-night scene) makes the exposure level unstable and is undesirable for the imaging apparatus. In the third embodiment, hysteresis is provided for each threshold to solve this inconvenience by differentiating conditions for determination as a night scene from conditions for exiting the state determined as the night scene.

The third embodiment will be described for determination conditions for determining a scene not as a night scene after the scene has been determined as the night scene. A compound condition for determination as a night scene is referred to as an "IN condition," and a compound condition for determining exit from the state determined as the night scene is referred to as an "OUT condition." The night scene determination conditions described above are defined as follows.

determination based on a point light source: determination A determination based on the histogram shape: determination B determination based on the ratio of the number of high-luminance pixels in the center portion: determination C For improving the detection accuracy, the IN condition is defined as an AND of these determination conditions as follows.

IN condition: (determination A and determination B and determination C)

Thus, the IN condition desirably determines a scene as a night scene if all the determination conditions indicate a night scene (positive).

However, if a scene is determined as not a night scene when any one of the determination conditions is not met after the night scene determination according to the above IN condition (if any one of the determination conditions results in negative), the determination is frequently switched. Therefore, after a scene is determined as a night scene according to the above IN condition, the scene is determined as not a night scene only if all the determination conditions fail to be met. This OUT condition allows stable control. Specifically, the OUT condition is defined as follows.

OUT condition: (not determination A and not determination B and not determination C)

The determination as a night scene is maintained until the above OUT condition is met. It is to be noted that this is merely an example, and the following example is also possible.

OUT condition: (not determination A and (not determination B or not determination C))

That is, the OUT condition may not be stricter than the IN condition and may be implemented as various combinations of the determination conditions. Thus, in the night scene detection with a plurality of determination conditions, the embodiment is characterized by differentiating the combination of determinations as the compound condition for exiting a state with a night scene detected (the OUT condition) from the combination of determinations as the IN condition.

Thus, the re-determination after detecting a night scene in the present invention has been described. According to the embodiment, stable night scene determination can be maintained even when changes in the object or panning would make the night scene detection unstable in imaging control using conventional night scene detection.

Although the above three determination schemes have been described in the embodiment, any plural number of determination schemes may be employed. A condition not included in the IN condition may be added to the OUT condition, or conversely, a condition included in the IN condition may not be included in the OUT condition. If two determination conditions are used as in the first and second embodiments, the determination as a night scene may be maintained until the both determinations result in negative.

Thus, according to the present invention, erroneous determination as a night scene is prevented in cases such as shooting a backlit scene or a high-contrast object, allowing improved accuracy of the night scene determination. Further, a shot image of an optimal luminance level without washed-out colors can be automatically obtained in shooting a night scene.

Although the above embodiments have been described for application to a digital video camera, application to a digital still camera is also possible. In this case, the above-described processes may be performed at the time of an auto-focus process in a digital camera to automatically set a night scene shooting mode. Besides imaging apparatuses, the present invention is also applicable to reproduction apparatuses such as a digital television that reproduces a moving image file and to application software executed in a personal computer. In this case, for each predetermined frame, a luminance value histogram of luminance signals of video and a contrast evaluation value for the video may be recorded in a moving image file, and may be read out and used. Alternatively, such information may be directly obtained by analyzing video signals of a reproduced moving image.

The present invention has been described in detail based on its preferred embodiments. However, the present invention is not limited to these specific embodiments but encompasses various embodiments without departing from the spirit of the present invention. It is also possible to combine some of the above-described embodiments as appropriate.

A single hardware unit may control the imaging apparatus, or a plurality of hardware units may share processing to thereby control the entire apparatus.

According to the video processing apparatus and a video processing method of the present invention, more accurate night scene determination is possible.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296389, filed Dec. 25, 2009, which is hereby incorporated by reference herein in its entirety.

What is claimed is:

1. A video processing apparatus comprising:
a first acquisition unit that acquires a histogram of luminance values from luminance signals of video captured by an image capturing unit;
a first determination unit that determines whether or not the video is a night scene video based on a shape of the histogram acquired by said first acquisition unit;
a second acquisition unit that acquires an evaluation value of contrast based on high frequency components of the luminance signals of the video;
a second determination unit that determines whether or not the video includes an object as a point light source based on the evaluation value acquired by said second acquisition unit; and
a night scene determination unit that determines that the scene captured by the image capturing unit is a night scene if said first determination unit determines that the video is a night scene video and if said second determination unit determines that the video includes an object as a point light source.

2. The apparatus according to claim 1, wherein
said second acquisition unit acquires a peak value of the high-frequency components for each horizontal line of the video and thereby acquires a total peak value for all horizontal lines of the video as the evaluation value, and
said second determination unit determines that the video includes a point light source if two upwardly protruding peaks on opposite sides of an in-focus position detected by an auto-focus unit provided in the image capturing unit are present in a change curve, the change curve indicating changes in the evaluation value with a movement of a focus lens by the auto-focus unit in an optical-axis direction.

3. The apparatus according to claim 1, wherein
said second acquisition unit acquires a peak value of the high-frequency components for each horizontal line of the video as the evaluation value, and
said second determination unit determines that the video includes a point light source if a ratio of the number of horizontal lines with the evaluation value larger than a second threshold to the number of horizontal lines with the evaluation value smaller than a first threshold is not higher than a predetermined value, the second threshold being larger than the first threshold.

4. The apparatus according to claim 1, wherein
the image capturing unit comprises an auto-focus unit that detects an in-focus position by using an evaluation value of contrast based on high-frequency components of luminance signals of video, and
the evaluation value acquired by said second acquisition unit is the evaluation value used by the auto-focus unit for detecting the in-focus position.

5. A video processing apparatus comprising:
a first acquisition unit that acquires a histogram of luminance values from video captured by an image capturing unit;
a first determination unit that determines whether or not the video is a night scene video based on a shape of the histogram acquired by said first acquisition unit;
a second acquisition unit that acquires the number of pixels with a luminance value larger than a predetermined luminance value within a partial area defined in the video;
a second determination unit that determines whether or not a ratio of the number of pixels acquired by said second acquisition unit to the total number of pixels in the video is higher than a predetermined value; and
a night scene determination unit that determines that the scene captured by the image capturing unit is a night scene if said first determination unit determines that the video is a night scene video and if said second determination unit determines that the ratio is higher than the predetermined value.

6. A video processing apparatus comprising:
a first acquisition unit that acquires a histogram of luminance values from video captured by an image capturing unit;

a first determination unit that determines whether or not the video is a night scene based on a shape of the histogram acquired by said first acquisition unit;

a second acquisition unit that acquires an average luminance value by multiplying luminance values of pixels inside a partial area defined in the video by a weighting value larger than a weighting value for pixels outside the partial area in the video and calculating an average of the luminance values in the video;

a second determination unit that determines whether or not the average luminance value acquired by said second acquisition unit is larger than a predetermined value; and a night scene determination unit that determines that the scene captured by the image capturing unit is a night scene if said first determination unit determines that the video is a night scene and if said second determination unit determines that the average luminance value is larger than the predetermined value.

7. The apparatus according to claim 1, wherein
said first determination unit divides the histogram into three ranges by a low-luminance threshold and a high-luminance threshold higher than the low-luminance threshold and acquires:

a low luminance level evaluation value acquired by calculating an average number of pixels having a luminance value of a low luminance level lower than the low-luminance threshold in the low luminance level range;

a high luminance level evaluation value acquired by calculating an average number of pixels having a luminance value of a high luminance level higher than the high-luminance threshold in the high luminance level range; and a middle luminance level evaluation value acquired by calculating an average number of pixels having a luminance value of a middle luminance level between the low-luminance threshold and the high-luminance threshold in the middle luminance level range, wherein said first determination unit determines that the captured video is a night scene if the low luminance level evaluation value is larger than the middle luminance level evaluation value and the high luminance level evaluation value.

8. The apparatus according to claim 1, wherein
after determining that said image capturing unit is capturing a night scene, said night scene determination unit maintains the determination that the image capturing unit is capturing a night scene until both of said first determination unit and said second determination unit provide a negative determination result.

9. The apparatus according to claim 5, further comprising:
a third acquisition unit that acquires an evaluation value of contrast based on high-frequency components of luminance signals of the video; and a third determination unit that determines whether or not the video includes an object as a point light source based on the evaluation value acquired by said third acquisition unit, wherein said night scene determination unit determines that the image capturing unit is capturing a night scene if both of said first determination unit and said second determination unit provide a positive determination result and if said third determination unit determines that the video includes an object as a point light source.

10. The apparatus according to claim 9, wherein
after determining that a night scene is being captured, said night scene determination unit maintains the determination that the scene captured by the image capturing unit is a night scene until all of said first determination unit, said second determination unit, and said third determination unit provide a negative determination result.

11. The apparatus according to claim 9, wherein
after determining that a night scene is being captured, said night scene determination unit maintains the determination that the image capturing unit is capturing a night scene until at least one of said second determination unit and said third determination unit provides a negative determination result and said first determination unit provides a negative determination result.

12. A video processing method comprising:
a first acquisition step of acquiring a histogram of luminance values from luminance signals of video captured by an image capturing unit;

a first determination step of determining whether or not the video is a night scene based on a shape of the histogram acquired in said first acquisition step;

a second acquisition step of acquiring an evaluation value of contrast based on high-frequency components of the luminance signals of the video;

a second determination step of determining whether or not the video includes an object as a point light source based on the evaluation value acquired in said second acquisition step; and a night scene determination step of determining that the scene captured by the image capturing unit is a night scene if the video is determined as a night scene in said first determination step and if the video is determined as including an object as a point light source in said second determination step.

13. A video processing method comprising:
a first acquisition step of acquiring a histogram of luminance values from video captured by an image capturing unit;

a first determination step of determining whether or not the video is a night scene based on a shape of the histogram acquired in said first acquisition step;

a second acquisition step of acquiring the number of pixels with a luminance value larger than a predetermined luminance value within a partial area defined in the video;

a second determination step of determining whether or not a ratio of the number of pixels acquired in said second acquisition step to the total number of pixels in the video is higher than a predetermined value; and a night scene determination step of determining that the scene captured by the image capturing unit is a night scene if the video is determined as a night scene in said first determination step and if the ratio is determined as higher than the predetermined value in said second determination step.

14. A video processing method comprising:
a first acquisition step of acquiring a histogram of luminance values from video captured by an image capturing unit;

a first determination step of determining whether or not the video is a night scene based on a shape of the histogram acquired in said first acquisition step;

a second acquisition step of acquiring an average luminance value by multiplying luminance values of pixels inside a partial area defined in the video by a weighting value larger than a weighting value for pixels outside the partial area in the video and calculating an average of the luminance values in the video;

a second determination step of determining whether or not the average luminance value acquired in said second acquisition step is larger than a predetermined value; and a night scene determination step of determining that the scene captured by the image capturing unit is a night scene if the video is determined as a night scene in said first determination step and if the average luminance value is determined as larger than the predetermined value in said second determination step.

15. A non-transitory computer-readable recording medium having stored therein a program for causing a computer to perform the video processing method according to claim 12.

* * * * *